(12) United States Patent
Rimoto et al.

(10) Patent No.: US 6,334,813 B1
(45) Date of Patent: Jan. 1, 2002

(54) COMPUTER READABLE RECORDING MEDIUM AND PROGRAM RECORDED WITH BALL GAME PROGRAM, AND BALL GAME PROCESSING APPARATUS AND METHOD

(75) Inventors: Shiyu Rimoto, Tokyo; Tomoaki Yoshinobu, Hyogo, both of (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/628,287

(22) Filed: Jul. 28, 2000

(30) Foreign Application Priority Data

May 15, 2000 (JP) .................................. 12-141275

(51) Int. Cl.$^7$ ................................... A63B 13/00
(52) U.S. Cl. .................. 463/3; 463/1; 463/4; 463/32
(58) Field of Search ................ 463/2–4, 31–32, 463/30, 7, 48, 49, 1; 273/317, 317.1, 317.2, 317.3, 317.4, 317.5, 317.6, 317.7, 317.8, 317.9

(56) References Cited

U.S. PATENT DOCUMENTS 5,435,554 A * 7/1995 Lipson ............................ 273/88
6,120,374 A * 9/2000 Akada et al. ..................... 463/3

FOREIGN PATENT DOCUMENTS

| JP | 2-502473 | 8/1990 |
| WO | 89/05404 | 6/1989 |

* cited by examiner

Primary Examiner—Jessica J. Harrison
Assistant Examiner—Yveste G Cherubin
(74) Attorney, Agent, or Firm—Greenblum & Bernstein, P.L.C.

(57) ABSTRACT

A ball game is provided, wherein the place to which the ball is moved can be input and designated according to the most suitable timing while balancing the movement of displayed players and the ease of the operation by the user. A button operation by the user can be accepted before the fielder receives the ball and, in the case that there is a button operation, the location corresponding to the operated button is judged. Then, the motion of the catching and the throwing of the ball by the fielder is judged so as to use the motion in order to process the motion before the fielder catches the ball. Finally, the display is shifted to the movement of the throwing the ball in the direction of the designated location.

12 Claims, 9 Drawing Sheets

| FIELDER ID | MOTION DATA | NUMBER OF FRAMES |
|---|---|---|
| 1 | #1<br>#2<br>#3 | 20<br>20<br>10 |
| 2 | #4<br>#5<br>#6 | 20<br>20<br>10 |
| 3 | #7<br>#8<br>#9 | 20<br>20<br>10 |
| ⋮ | ⋮ | ⋮ |

COMPUTER READABLE RECORDING MEDIUM AND PROGRAM RECORDED WITH BALL GAME PROGRAM, AND BALL GAME PROCESSING APPARATUS AND METHOD

The present disclosure relates to subject matter contained in Japanese Patent Application No. 2000-141275, filed on May 15, 2000, the disclosure of which is expressly incorporated herein by reference its entirety.

BACKGROUND OF THE INVENTION

1. Field of the Invention

The present invention relates to a computer readable recording medium where a ball game program is recorded and to the program which, for example, controls players and the ball in the ball game as well as to a ball game processing device and method.

2. Description of the Related Art

As for sports-type games today not only one-to-one games but, also, team games, such as tennis, soccer, basketball, American football and baseball, have been developed.

To play those sports-type games for operation it is necessary to input using an operation unit (such as an operation panel and keypad) prepared in advance for an arcade entertainment machine or a game machine (such as PlayStation (made by Sony Computer Entertainment Co. Ltd.) or Dreamcast (made by Sega Enterprises Co. Ltd.)).

The operation unit is, in general, formed of keys (or buttons) or joysticks. The operational system is organized with a limited number of buttons and joysticks on the operation unit, either for sports-type games or role playing games. Games are, of course, able to be played on a personal computer and, when a keyboard is used, keys on the keyboard are allocated for the keys necessary for the game operation.

In general, as for ball games such as baseball, soccer, basketball or the like among sports-type games, the movement of the ball itself cannot be operated by buttons or joysticks. Instead, the user is able to operate the movement of the player holding the ball or the movement of the player reacting to the approaching ball and, thereby, the subsequent direction of, or momentum of, ball movement are operated indirectly.

In a baseball game, in the case that the ball hit by the batter goes toward the short stop under the condition where there are no runners on base, it is possible to make the short stop catch the ball within the possible action range of the short stop. When the ball is caught the user can input the operation for throwing the ball toward first base so that the short stop throws the ball to first base. If the first baseman has already covered first base the thrown ball is caught by the first baseman. In this way, under the condition where the short stop caught the ball, it is possible to indicate where the ball is thrown next by the operational input (button operation) of the user.

With respect to this type of technology, for example, there exists the Japanese patent publication 2502473. In this publication, technology is disclosed for the determination of the base to which the ball is thrown, and the subsequent movement of the ball to the determined base, in response to the button operation of the user after confirmation that the fielder has caught the ball.

As in the above described publication, conventionally the place to which the ball is moved (in the above publication a base is indicated) is input through the operation at the time when the ball is received (in the above publication indicating when the ball is caught) by the player (in the above publication indicating a fielder) and, therefore, the user needs to pay attention to the timing when the player receives the ball.

Therefore, in a baseball game, in the case when a user who is not accustomed to the operation operates, the immediate operation cannot be inputted when the fielder catches the ball and there are some cases where the timing of making an out of a batter or a runner may be off.

And, in the case that, a user who has become accustomed to the operation operates, the operational input cannot be accepted in spite of the fact the base to which the ball is thrown can be expected before the fielder catches the ball, there are some cases where the frustration is given with respect to the ease of operation by the user.

Though in the above, the case of a baseball game is described as an example, other ball games, such as soccer, basketball, tennis, American football, ice hockey or the like can be substituted.

SUMMARY OF THE INVENTION

The purpose of the present invention is to provide a computer readable recording medium where a ball game program is recorded and the program where the place to which the ball is moved is able to be input and designated to the most suitable timing while balancing the movement of the displayed players and the ease of operation by the user as well as a ball game processing device and method.

In order to achieve the above described purpose, according to the first mode of this invention, a computer readable recording medium is provided, where a program of a ball game, that implements a ball game in which the movement of players and a ball are controlled on a display using buttons, is recorded, and where the program is recorded for making the computer implement: accepting a button operation by a user even before a player receives the ball; making each of the buttons, respectively, correspond to a different predetermined place to which the ball is moved in accordance with the game in progress and judging the predetermined place to which the ball is moved, to which the operated button is made to correspond, in response to the button operation by the user; and displaying the motion wherein the ball is moved to the predetermined place which has been judged with respect to the player.

According to the second mode of the present invention, a computer readable recording medium is provided, where a program of a ball game, that implements a ball game in which the movement of players and a ball are controlled on a display using buttons, is recorded, and where the program is recorded for making the computer implement: accepting a button operation by a user even before a player receives the ball; making each of the buttons, respectively, correspond to a different predetermined place to which the ball is moved in accordance with the game in progress and judging the predetermined place to which the ball is moved, to which the operated button is made to correspond, in response to the button operation by the user in the case that the button operation by the user is accepted before the player receives the ball; and displaying the motion wherein the ball is moved to the predetermined place, which has been judged with respect to the player, including the condition before the ball is received by the player.

According to the third mode of the present invention, a program of a ball game, that implements a ball game in which the movement of players and a ball are controlled on a display using buttons, is provided for making a computer implement: accepting a button operation by a user even before a player receives the ball; making each of the buttons, respectively, correspond to a different predetermined place to which the ball is moved in accordance with the game in progress and judging the predetermined place to which the ball is moved, to which the operated button is made to correspond, in response to the button operation by the user; and displaying the motion wherein the ball is moved to the predetermined place which has been judged with respect to the player.

According to the fourth mode of the present invention, a program of a ball game, that implements a ball game in which the movement of players and a ball are controlled on a display using buttons, is provided for making a computer implement: accepting a button operation by a user even before a player receives the ball; making each of the buttons, respectively, correspond to a different predetermined place to which the ball is moved in accordance with the game in progress and judging the predetermined place to which the ball is moved, to which the operated button is made to correspond, in response to the button operation by the user in the case that the button operation by the user is accepted before the player receives the ball; and displaying the motion wherein the ball is moved to the predetermined place, which has been judged with respect to the player, including the condition before the ball is received by the player.

According to the fifth mode of the present invention, a ball game processing device is provided which includes a computer readable recording medium where a program, that implements a ball game in which the movement of players and a ball are controlled on a display using buttons, is recorded; a computer which reads out at least part of the program from the recording medium so as to be implemented; and a display for displaying the ball game implemented by the computer, wherein the computer reads out at least part of the program from the recording medium and includes: accepting a button operation by a user even before a player receives the ball; making each of the buttons, respectively, correspond to a different predetermined place to which the ball is moved in accordance with the game in progress and judging the predetermined place to which the ball is moved, to which the operated button is made to correspond, in response to the button operation by the user; and displaying, on the display, the motion wherein the ball is moved to the predetermined place which has been judged with respect to the player.

According to the sixth mode of the present invention, a ball game processing device is provided which includes: a computer readable recording medium where a program, that implements a ball game in which the movement of players and a ball are controlled on a display using buttons, is recorded; a computer which reads out at least part of the program from the recording medium so as to be implemented; and a display for displaying the ball game implemented by the computer, wherein the computer reads out at least part of the program from the recording medium and includes: accepting a button operation by a user even before a player receives the ball; making each of the buttons, respectively, correspond to a different predetermined place to which the ball is moved in accordance with the game in progress and judging the predetermined place to which the ball is moved, to which the operated button is made to correspond, in response to the button operation by the user in the case that the button operation by the user is accepted before the player receives the ball; and displaying, on the display, the motion wherein the ball is moved to the predetermined place, which has been judged with respect to the player, including the condition before the ball is received by the player.

According to the seventh mode of the present invention, a method for processing a ball game is provided, that implements a ball game in which the movement of players and a ball are controlled on a display using buttons, and the method for processing a ball game includes: accepting a button operation by a user even before a player receives the ball; making each of the buttons, respectively, correspond to a different predetermined place to which the ball is moved in accordance with the game in progress and judging the predetermined place to which the ball is moved, to which the operated button is made to correspond, in response to the button operation by the user; and displaying the motion wherein the ball is moved to the predetermined place which has been judged with respect to the player.

According to the eighth mode of the present invention, a method for processing a ball game is provided, that implements a ball game in which the movement of players and a ball are controlled on a display using buttons, and the method for processing a ball game includes: accepting a button operation by a user even before a player receives the ball; making each of the buttons, respectively, correspond to a different predetermined place to which the ball is moved in accordance with the game in progress and judging the predetermined place to which the ball is moved, to which the operated button is made to correspond, in response to the button operation by the user in the case that the button operation by the user is accepted before the player receives the ball; and displaying the motion wherein the ball is moved to the predetermined place, which has been judged with respect to the player, including the condition before the ball is received by the player.

And in each of the modes of the present invention, the computer may further be made to implement displaying the motion wherein the ball is moved to the predetermined place which is so judged with respect to the player as well as displaying the movement of the ball to the predetermined place as being so judged following the display of the motion.

DESCRIPTION OF THE PREFERRED EMBODIMENTS

In the following, one mode of the present invention is described in detail in reference to the attached drawings. In the following description, a baseball game is described as an example which is cited as one of the possible ball games.

Figure 1:
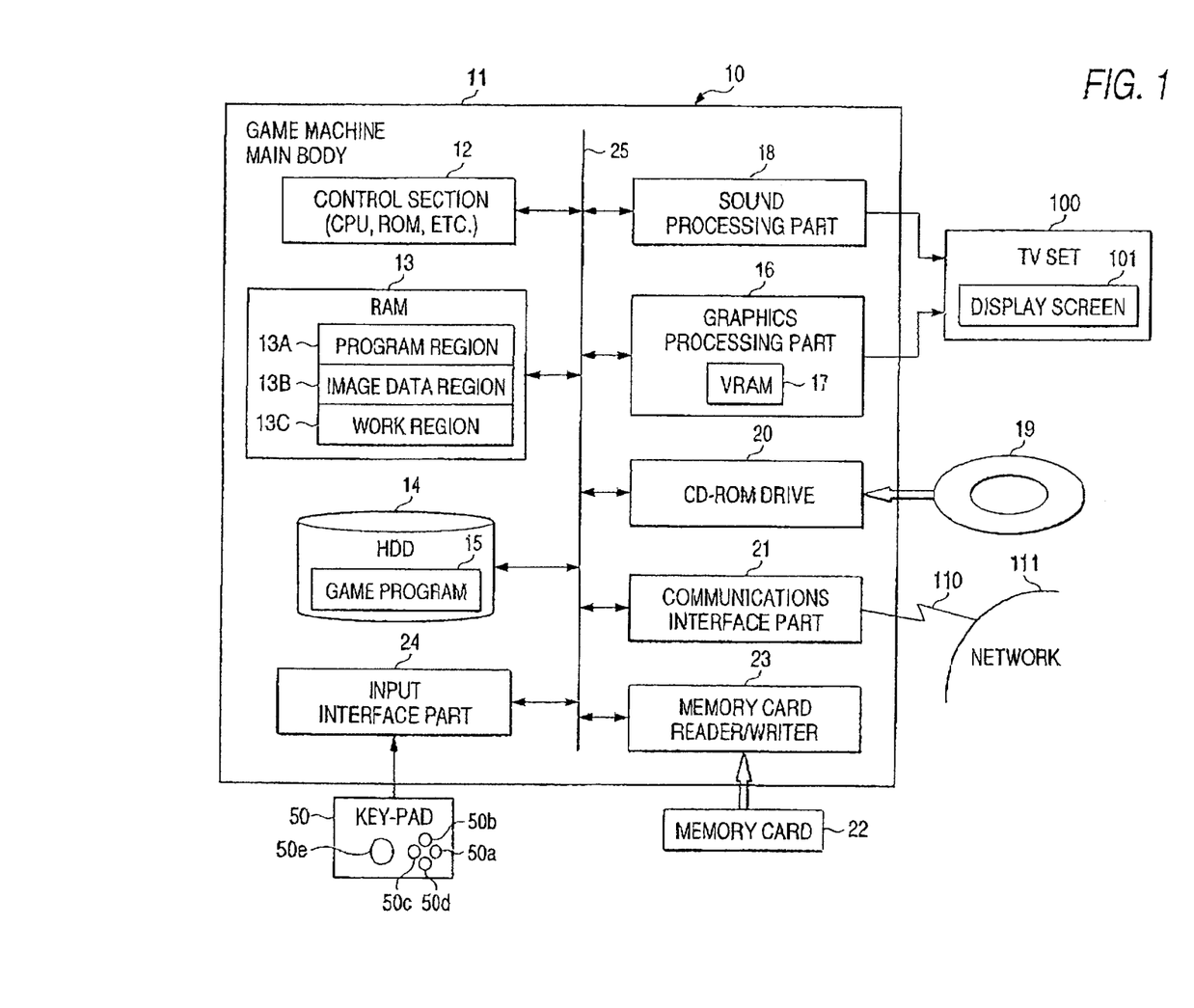
FIG. 1 is a block diagram showing an example of the device configuration according to one embodiment of the present invention.

First, the configuration is described using FIG. 1. FIG. 1 shows a configuration example of a video game device according to one mode of the present invention. A video game device 10, as shown in FIG. 1, is provided with the functions of a ball game processing device according to the present invention. And this video game device 10 carries out a program recorded in a computer readable recording medium according to the present invention. This video game device 10 carries out a program according to the present invention. This video game device 10 is utilized for implementing a ball game processing method according to the present invention.

The video game device 10 includes, for example, a game machine body 11 for processing the video game according to the program, a keypad 50 for operating the video game interactively and a television set (hereinafter referred to as a TV set) 100 having a CRT, or the like, as a monitor with (a) speaker(s). This video game device 10 also includes a communications interface part 21 which carries out data communications with other devices by being selectively connected to a network 111 by the communications line 110.

The keypad 50 has a group of buttons, such as buttons 50a, 50b, 50c and 50d, and a joystick 50e so that the user (operator) is able to exercise operation and commands, through the button operation or the joystick operation of the user, which are given to the game machine body 11. Here, the buttons or the joystick 50e have the functions for the operational input of the pitching operation of pitchers, the swinging operation of batters, the base stealing operation of runners, the catching/throwing operations of fielders, or the like, in the operations of the baseball game described later. As for the group of buttons, for example, first base, second base, third base and home plate are, respectively, made to correspond to the buttons 50a, 50b, 50c and 50d in playing the game. Therefore, it is possible to form a displayed image on the display where the ball is thrown by a fielder in accordance with the button operation and the ball is moved to a desired base corresponding to the operational button.

The TV set 100 produces a picture (image) display and sound output in accordance with the game contents based on the video signal (image signal) and the sound signal output from the game machine body 11.

The game machine body 11 has an internal bus 25. To this internal bus 25, a control part 12 including units such as a CPU or a ROM, a RAM 13 and a hard disk drive (hereinafter referred to as HDD) 14, are connected.

The control part 12 controls the entire device and stores all, or part of, the program in the RAM 13 to carry out the game processing.

The RAM 13 includes a program region 13A, an image data region 13B and a work region 13C. The program region 13A stores the program of the game. More concretely, the program region 13A stores a part of, or all of, the game program which is read from the CD-ROM 19 by the CD-ROM driver 20. The image data region 13B stores image data, such as the background or the game characters, necessary for the process of carrying out the program. The work region 13C stores various types of data generated in the process of carrying out the program.

The game program or the image data are able to be supplied from the HDD 14 in addition to the CD-ROM 19. In this case the game program or the image data may be stored in the hard disk 15 of the HDD 14. The game program or the image data may be stored in the hard disk 15 through installment in advance or through a download from the network 111 via the communications line 110.

And an input interface part 24, a sound processing part 18 and a graphics processing part 16 are connected to an internal bus 25. The keypad 50 is connected to the internal bus 25 via an interface part 24. And the TV set 10 is connected to the internal bus 25 via the sound processing part 18 and the graphics processing part 16, respectively.

The graphics processing part 16 includes a VRAM 17 having a frame buffer. This graphics processing part 16 generates a video signal based on the image data stored in the frame buffer by the command of the control part 12 accompanying the program which is being carried out so that the video signal is output to the TV set 100. Thereby, an image display from the image data stored in the frame buffer on the display screen 101 of the TV set 100.

The sound processing part 18 generates sound signals such as BGM (Background Music), or sound effects in accordance with the command from the control part 12 and outputs the sound signal to the TV set 100.

In addition, the CD-ROM drive 20 and the memory card reader/writer 23 are connected to the internal bus 25. The CD-ROM drive 20 reads out the game programming, image data, sound data or the like stored in the CD-ROM 19 which is a recording medium. The memory card reader/writer 23 carries out data write-in and data read-out to the memory card 22 in accordance with the control of the control part 12. As for the data written into the memory card 22, there exists data showing games still in progress and data showing the environment setting of the game.

Next, the relationships between the condition change and the operation according to the present mode are described. FIGS. 2A, 2B, 2C, 2D, 2E, 2F and 2G are views for explaining an example of the motion involved in catching the ball according to the present mode using the condition change. FIGS. 3A, 3B, 3C, 3D, 3E, 3F and 3G are views for explaining an example of the motion from the catching of the ball to the throwing of the ball according to the present mode using the condition change. FIGS. 4A, 4B, 4C, 4D, 4E, 4F and 4G are views for explaining another example of the motion from the catching of the ball to the throwing of the ball according to the present mode using the condition change.

First, an example of the case where there was no operational input indicating the place to which the ball is thrown is described. FIGS. 2A, 2B, 2C, 2D, 2E, 2F and 2G show an example of the condition change of the motion involved in catching the ball. In FIGS. 2A, 2B, 2C, 2D, 2E, 2F and 2G, a display screen is denoted as 101, a fielder is denoted as 61, a glove is denoted as 62 and a ball is denoted as 70, respectively.

Figure 2A:
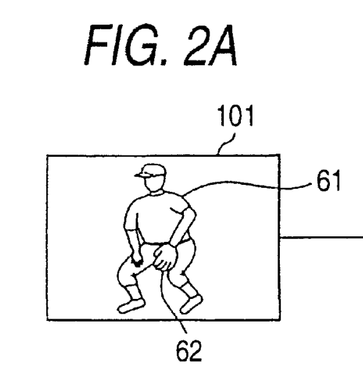
FIGS. 2A, 2B, 2C, 2D, 2E, 2F and 2G are views for explaining an example of the motion of the catching of the ball according to one mode of the present invention.

As shown in FIG. 2A, the fielder 61 is taking the posture of waiting to catch the ball with the glove 62 on his hand. In the case that the fielder 61 is a player who is operable, the button operation for the fielder 61 by the user can already be accepted when the ball 70 is hit by a batter or the ball 70 is thrown by another fielder. The user can operate a button on the keypad 50 to indicate a desired base. At this point, at least, first base, second base, third base and home plate are made to correspond to the four buttons 50*a*, 50*b*, 50*c* and 50*d*. In the case that the ball hit by the batter flies into the outfield when the button 50*d* is operated to send the ball back to home plate, the ball is relayed after once being caught to express, for example, a more realistic playing feel.

The fielder 61 is determined as the player who catches the ball and, even under this condition where there is no operational input specifying the base to which the ball is thrown at this point in time, the motion involving, at least, the catching of the ball is determined at approximately the same time as the time when the player who catches the ball is determined. Thereby, the movement of the fielder 61 involved in the catching of the ball is started. Here, the player who catches the ball is determined through the operation by computer. The operation by computer calculates and finds a player who can most quickly reach the ball, among the one or more players who are close to the path of the ball 70 in accordance with the operation (button operation, joystick operation or the like) of each fielder by the user.

In this example, the fielder 61 is determined as the player who catches the ball. Here, the determined motion involves the movement of waiting until the next operational input after the catching of the ball. Here, in the case that a highly sophisticated motion processing is desired, the most suitable place (base) to which the ball is thrown may be determined in accordance with the progress condition of the game, that is to say in accordance with the existence of runners on base, conditions of fielders, or the like. Here, motion indicates the motion which is suitable for the fielders to catch the ball and throw the ball to the most suitable place to which the ball is thrown (the most suitable base).

Here, as for the management of the motion, multiple types of motions may be corresponded to each fielder or the same motion may be shared among fielders. It becomes possible to emphasize a realistic expression when each fielder has independent motions, on the other hand, the shared motion among fielders makes it possible to simplify the data management and motion expressions.

Figure 2B:
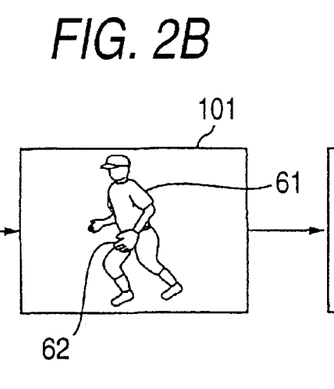

When the motion determined in this way is started, as shown in FIG. 2B, the fielder 61 is controlled in the movement toward the position the ball 70 is going to arrive in the future (right direction in the example of FIG. 2B) under the motion control of the computer.

Figure 2C:
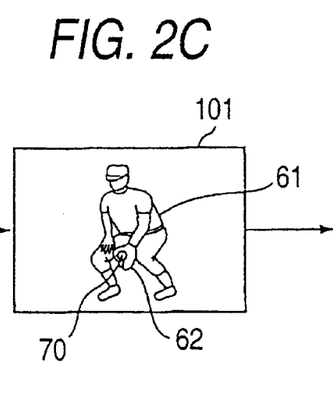

When the fielder 61 is positioned in the path of the ball 70 and has arrived at the position of the ball 70, as shown in FIG. 2C, the motion of the fielder 61 catching the ball 70 is displayed. At this time the position of the glove 62 may be corrected through the image processing so as to increase the precision of the motion display. Therefore, the adjustment may be made so that the position where the ball 70 arrives in the future is expected and the glove 62 is moved to that expected position.

Figure 2D:
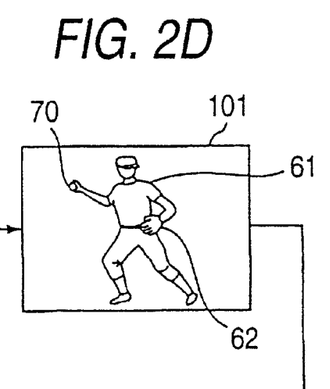

After the catching of the ball, as shown in FIG. 2D, the motion in sequence is shifted to the motion immediately before the throwing of the ball by the fielder 61. For example, the motion is displayed on the way of shifting to the movement of the throwing of the ball 70 to second base which is the most suitable place to which the ball is thrown.

Figure 2E:
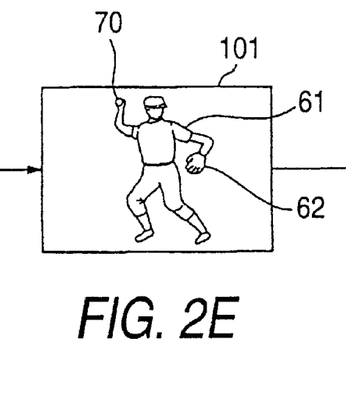

After that, as shown in FIG. 2E, the motion of the fielder 61 becomes the stance immediately before throwing the ball 70 to the most suitable place to which the ball is thrown (for example, second base). Here, no operation is input before and after the time when the fielder 61 catches the ball 70 and, therefore, the motion is shifted to FIGS. 2F and 2G.

Figure 2F:
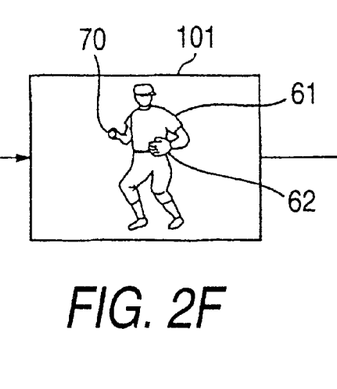
Figure 2G:
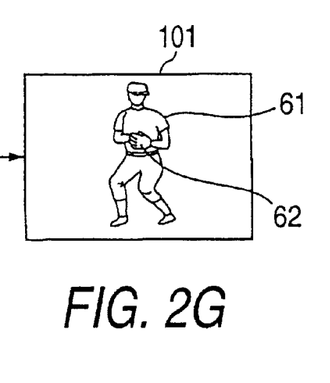

In the case that there still is no operational input even when the stance for throwing the ball (see FIG. 2E) is achieved, the motion is displayed where the fielder 61 lowers the arm holding the ball 70 as shown in the next FIG. 2F. After that, as shown in FIG. 2G, the fielder 61 converts to the condition of waiting. Under the condition of waiting, the ball 70 is, for example, held at the position of the chest so as to maintain the condition where it is thrown as soon as the position to which the ball is thrown is determined.

In this way, in the case that there is no button operation for the throwing of the ball by the user, the movement of the fielder can be expressed by using the motion where the condition of the stance for throwing the ball is naturally shifted to the condition of waiting. Based on the motion of this fielder in sequence, the movement of the ball is indirectly controlled on the display.

Next, an example is described in the case that the place to which the ball is thrown is button operated by the user. FIGS. 3A, 3B, 3C, 3D, 3E, 3F and 3G show an example of the condition change of a motion group from the catching of the ball to the throwing of the ball. FIGS. 3A, 3B, 3C, 3D, 3E, 3F and 3G all show images displayed on the display screen 101. In the FIGS. 3A, 3B, 3C, 3D, 3E, 3F and 3G, a destination fielder is denoted as 81, a glove is denoted as 82 and a base is denoted as 71, respectively.

Figure 3A:
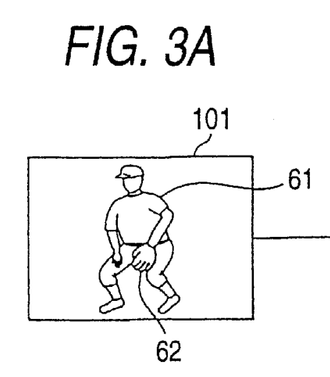
FIGS. 3A, 3B, 3C, 3D, 3E, 3F and 3G are views for explaining an example of the motion from the catching of the ball to the throwing of the ball according to one mode of the present invention.

As shown in FIG. 3A, the fielder 61 takes a posture of waiting to catch the ball under the condition where the glove 62 is on his hand. In the case that the fielder 61 is a player who is operable, user button operation for the fielder 61 is already acceptable at the time when the ball 70 is hit by the batter or another fielder throws the ball 70. In the same way as the description of the above described FIG. 2A, the user can indicate the desired place to which the ball is thrown through the operation of the keypad 50 by the user.

In the case that the fielder 61 is determined as the player who catches the ball and the button 50B is operated to designate, for example, second base, the motion from the catching of the ball to the throwing of the ball is determined at approximately the same time as the player who catches the ball is determined. Thereby, the movement from the catching of the ball to the throwing of the ball by the fielder 61 is started. Here, the player who catches the ball is determined through the operation by computer. The operation by computer calculates the fielder who can most quickly reach the ball among one or more fielders close to the path of the ball 70 in accordance with the operation of each fielder (button operation, joystick operation, or the like) by the user.

In this example, the fielder 61 is determined as the player who touches the ball. And the motion determined here is a motion which is suitable for catching the ball and for throwing the ball to the place to which the ball is thrown, for example to second base, and which is indicated through the button operation by the user. As for the management of the motion, multiple types of motion may correspond to each fielder or the same motion may be shared among fielders. It becomes possible to emphasize a realistic expression when each fielder has independent motions, on the other hand, the shared motion among fielders makes it possible to simplify the data management and motion expressions.

Figure 3B:
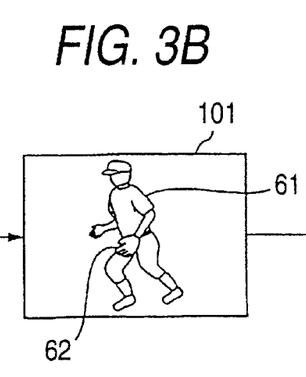

When the motion determined in this way is started, as shown in FIG. 3B, the fielder 61 is controlled, in movement, in the direction toward the position the ball 70 is going to arrive at in the future (direction to the right in the example of FIG. 3B) under the motion control of the computer.

Figure 3C:
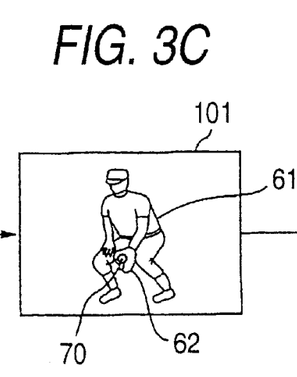

When the fielder 61 is positioned in the path of the ball 70 and has arrived at the position of the ball 70, as shown in FIG. 3C, the motion of the fielder 61 catching the ball 70 is displayed. At this time the position of the glove 62 may be corrected through image processing so as to increase the precision of the motion display. Therefore, adjustment may be made so that the position where the ball 70 arrives in the future can be predicted and the glove 62 is moved to that expected position.

Figure 3D:
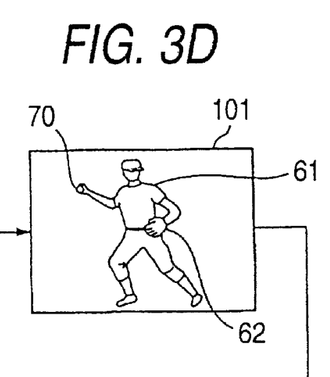

After the catching of the ball, as shown in FIG. 3D, the motion in sequence is shifted to the motion of the throwing of the ball by the fielder 61. In this example, the motion of shifting, which is in progress, to the movement of throwing the ball 70 towards second base by the fielder 61 is displayed.

Figure 3E:
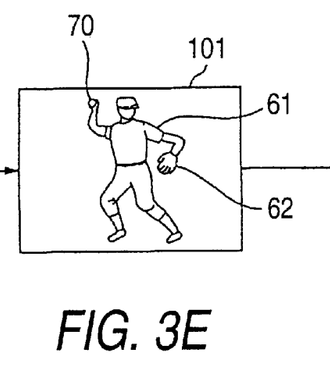
Figure 3F:
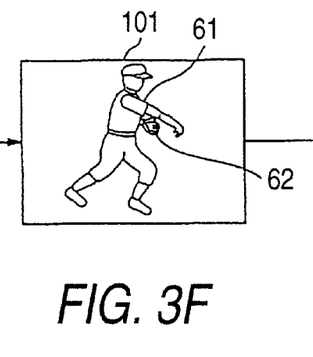

After that, as shown in FIG. 3E, the motion of the fielder 61 is converted to the stance immediately before the throwing of the ball 70 to second base. Here, since the input operation of the button 50b is carried out for designating, for example, second base as the place to which the ball is, immediately before the fielder 61 catches the ball 70, thrown, as shown in FIG. 3F, and the motion of the fielder 61 is shifted to the motion of throwing the ball 70 to second base, which is the place to which the ball is thrown.

Figure 3G:
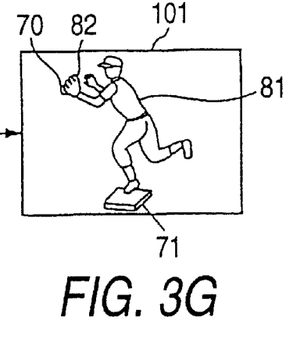

When the ball is thrown toward second base by the fielder 61, as shown in FIG. 3G, the ball 70 is caught by the destination fielder 81 who covers second base (the place to which the ball is thrown). In this example, since the condition is that the destination fielder 81 comes to cover second base 71, the fielder 81 on second base catches the ball 70 after it is thrown to second base. Here, as for the movement of the fielders who receive the thrown ball such as the fielder 81, control may be exercised so that, for example, the fielder in the most suitable position goes to cover each base in accordance with the progress condition of the game after the ball has been hit.

In this way, when the button 50b is operated to designate second base as the place to which the ball is thrown, the movement of the fielder 61 is controlled on the display, showing the motion suitable for throwing the ball to second base. That is to say, before the fielder 61 catches the ball 70, the place to where the ball 70 should be thrown has already been determined through the button operation by the user.

Therefore, the user does not need to operate buttons (indication of the place to which the ball is thrown) to accord with the timing of the catching of the ball by the fielder, and it becomes possible to operate the button (indication of the place to which the ball is thrown) immediately after judging the conditions of the scenes after the batter hits the ball. Thereby, it becomes possible to indicate the place to which the ball is thrown in accordance with the reaction speed of the user without causing frustration to the user.

Moreover, since the motion of the fielder can be determined before the catching of the ball, it becomes possible to smoothly shift the motion in sequence from the catching of the ball to the throwing of the ball.

In the above described FIGS. 3A, 3B, 3C, 3D, 3E, 3F and 3G the case where there is a button operation by the user before the catching of the ball (before FIG. 3A) is described. For example, according to whichever timing of the button operation, as long as it is before either one of FIGS. 3C, 3D and 3E, for designating the place to which the ball is thrown it is possible to realize the movement of catching the ball or throwing the ball with the most suitable motion. The button operation for designating the place to which the ball is thrown is according to the timing of the status after any one of FIGS. 3C, 3D and 3E and the motion to this point is synthesized with the motion according to the place to which the ball is thrown. In this motion synthesis, the motion to this point and the motion according to the place to which the ball is thrown, and which is designated, may be synthesized along the same time axis or the subsequent motion according to the place to which the ball is thrown may be linked to the motion to this point.

In the examples shown in FIGS. 3A, 3B, 3C, 3D, 3E, 3F and 3G, second base is the place to which the ball is thrown and, as another example, the case where another base is designated as the place to which the ball is thrown is next described using the FIGS. 4A, 4B, 4C, 4D, 4E, 4F and 4G.

In the following example, the case is shown where, immediately after the fielder 61 catches the ball 70 (see FIG. 4C) the user operates, for example, the button 50c and, thereby, third base is indicated as the place to which the ball is thrown. Here, the change of the displayed images (FIGS. 4A, 4B, and 4C) from the condition of waiting to catch the ball to the condition of the catching of the ball is the same as that of the examples shown in FIGS. 3A, 3B and 3C, respectively, of which the description is omitted. Here, in FIG. 4, a base is denoted as 72, a destination fielder is denoted as 91 and a glove is denoted as 92, respectively.

Figure 4A:
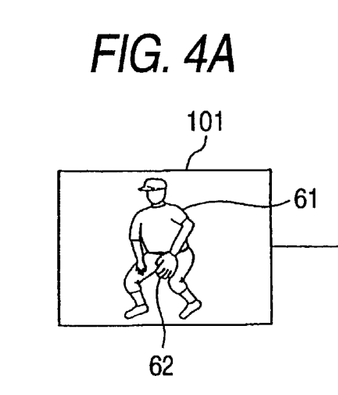
FIGS. 4A, 4B, 4C, 4D, 4E, 4F and 4G are views for explaining another example of the motion from the catching of the ball to the throwing of the ball according to one mode of the present invention.
Figure 4B:
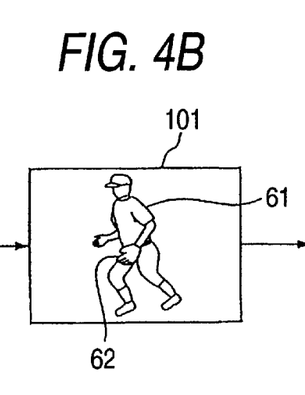
Figure 4C:
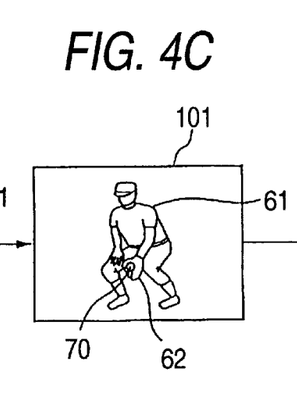
Figure 4D:
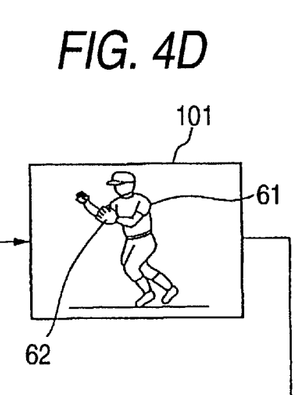
Figure 4E:
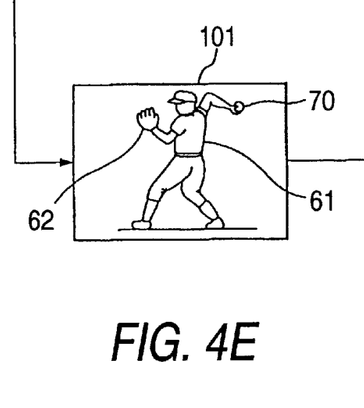

When the user operates, for example, the button 50c to input and indicate the place to which the ball is thrown as third base, then, as shown in FIG. 4D, the motion of the fielder 61 turning his body around to face third base is displayed through the motion synthesis. After that, as shown in FIG. 4E, the motion of the fielder shifts to the motion of the throwing of the ball toward third base.

Figure 4F:
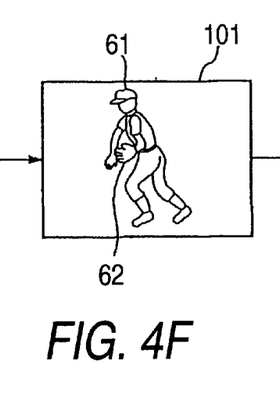
Figure 4G:
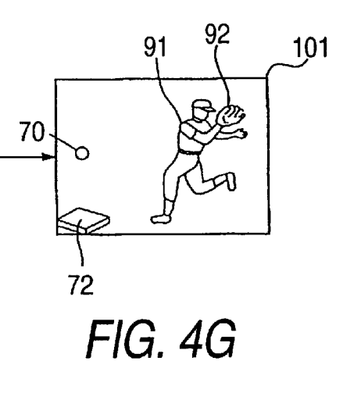

After that, the ball is thrown and, as shown in FIG. 4F, the posture of the fielder 61 after throwing the ball is displayed on the display screen 101. Next, as shown in FIG. 4G, the motion of the fielder 91 who covers third base and attempts to receive the ball 70 is displayed on the display screen 101. In this example, the fielder 91 is in the posture of running toward third base 72. However, the fielder 91 has not reached third base at the time the ball 70 passes through third base, and eventually the scene is formed where the ball 70 passes through third base.

In this way, as shown in FIGS. 3A, 3B, 3C, 3D, 3E, 3F, 3G and FIGS. 4A, 4B, 4C, 4D, 4E, 4F and 4G, the designation of the place to which the ball is thrown can be received before the fielder catches the ball and even if the place to which the ball is thrown is designated after the fielder catches the ball the movement of the fielder can be expressed in a natural motion by the motion synthesis.

Figure 5:
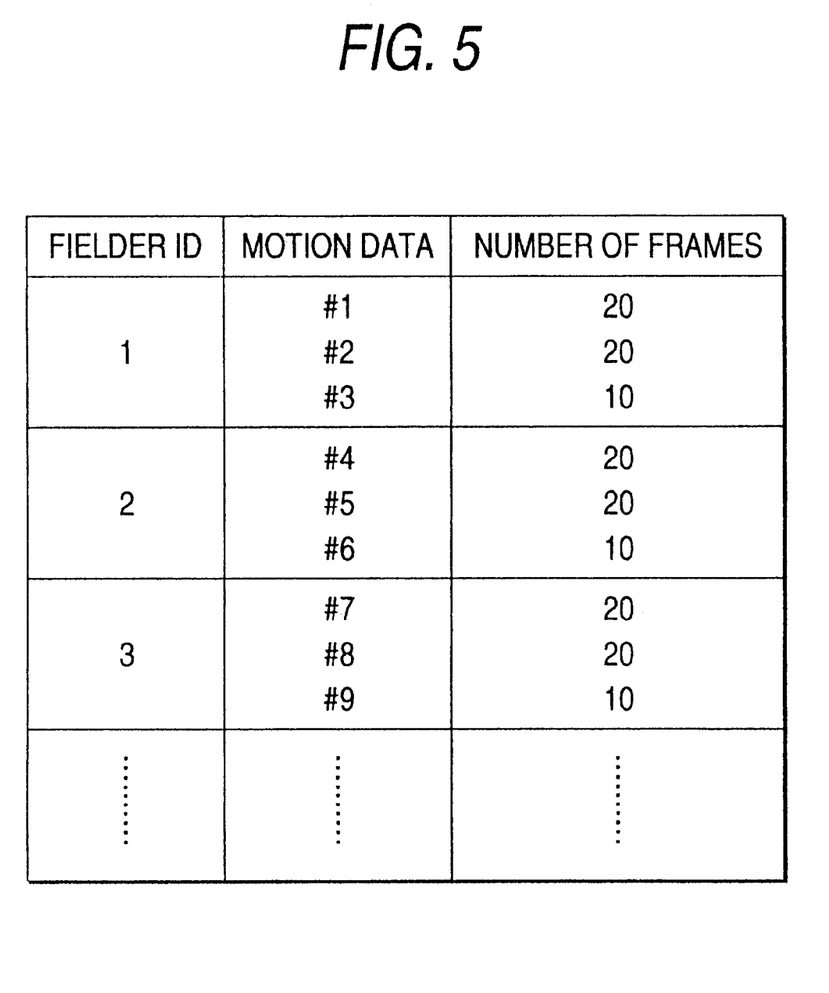
FIG. 5 is a view for schematically explaining an example of the motion management according to one mode of the present invention.
Figure 6:
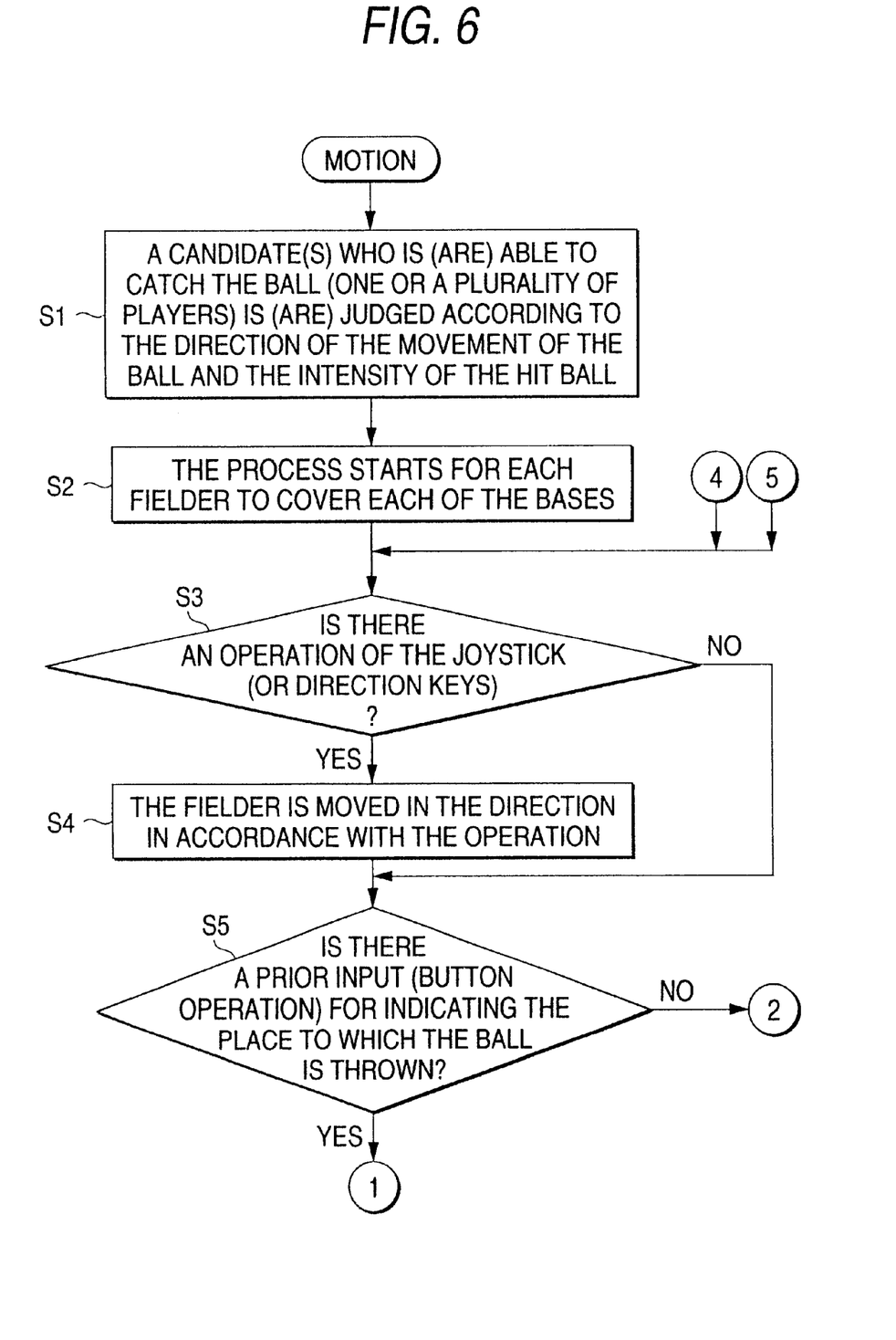
FIG. 6 is a flowchart for explaining an example of the movement according to one mode of the present invention.

Next, a method for managing the motion corresponding to the catching of the ball and the throwing of the ball is described. FIG. 5 is a table for schematically describing an example of the motion management according to the present mode. As shown in FIG. 5, IDs Identification Information) for specifying fielders are added to each fielder such as 1, 2, 3_E_E_E. The number of frames which is necessary for motion data for a sequence of motions that the fielders perform and for drawing the motion data is made to correspond to each of the fielder IDs. The number of pieces of motion data which are made to correspond to the fielders is variable in many ways due to the expressive technology of the game, design items of the game, and the like. In the case that the program of the ball game is, for example, stored in the CD-ROM 19, this motion management table is read-out from the CD-ROM 19 in accordance with the game in progress and is stored in the work region 13C of the RAM 13.

For the fielder with the fielder ID 1, for example, three types of motion data, #1, #2 and #3 are prepared. 20 frames, 20 frames and 10 frames are made to correspond, respectively, to the types of motion data #1, #2 and #3, respectively. For example, in the case that the type of motion data of #1 is adopted, the motion is reproduced in 20 frames.

For the fielder with the fielder ID 2, for example, three types of motion data, #4, #5 and #6 are prepared. 20 frames, 20 frames and 10 frames are made to correspond, respectively, to the types of motion data #4, #5 and #6, respectively. For example, in the case that the type of motion data of #4 is adopted, the motion is reproduced in 20 frames.

For the fielder with the fielder ID 3, for example, three types of motion data, #7, #8 and #9 are prepared. 20 frames, 20 frames and 10 frames are made to correspond, respectively, to the types of motion data #7, #8 and #9, respectively. For example, in the case that the type of motion data of #7 is adopted, the motion is reproduced in 20 frames.

Though not shown, for the fielder ID 4, or those following, motion data and the number of frames are made to correspond in the same way. Here, the number of the types of the motion data and the number of frames which are made to correspond to the fielders are merely examples, which are variable in many ways.

Figure 7:
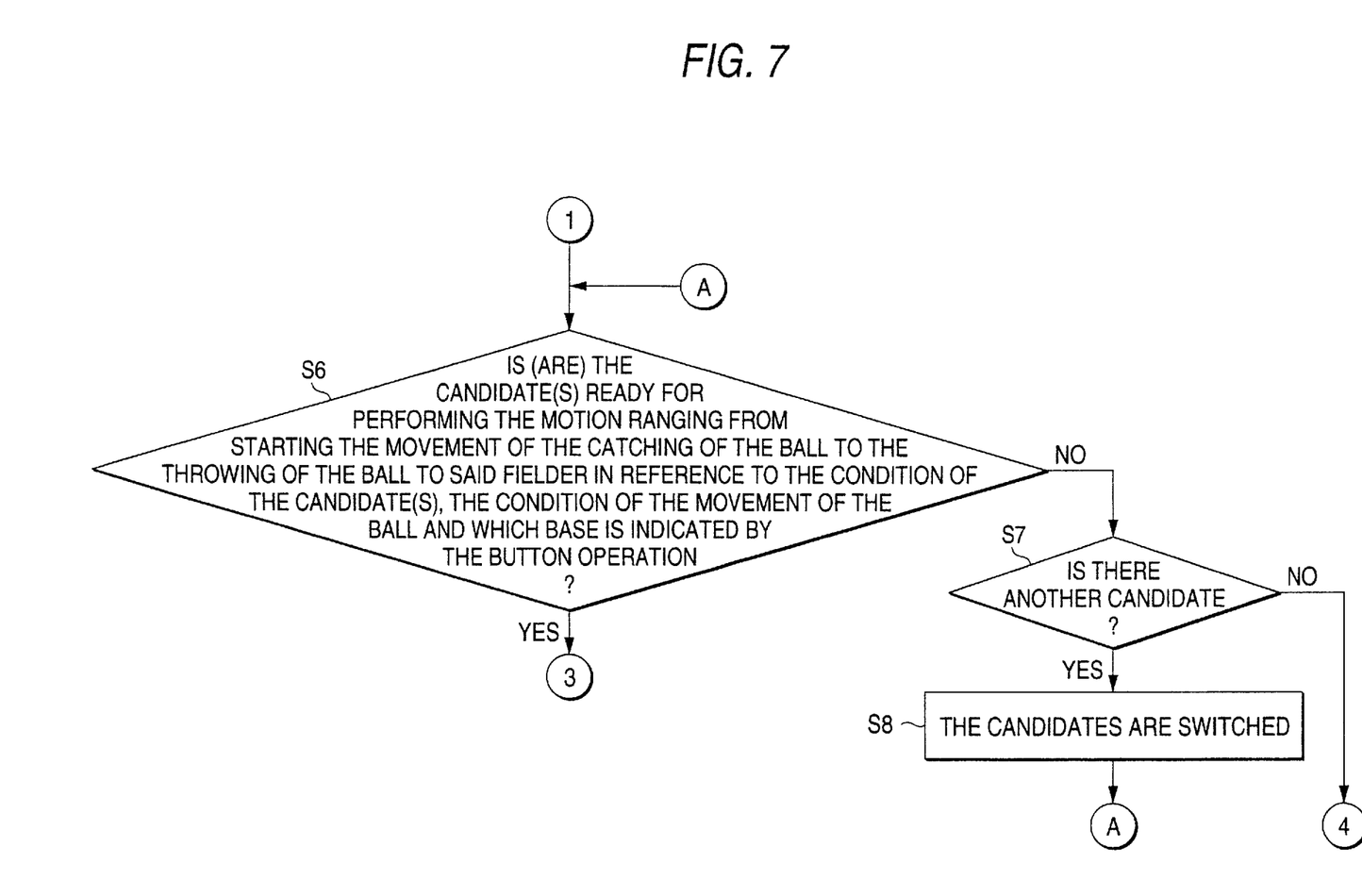
FIG. 7 is a flowchart for explaining an example of the movement according to one mode of the present invention.
Figure 8:
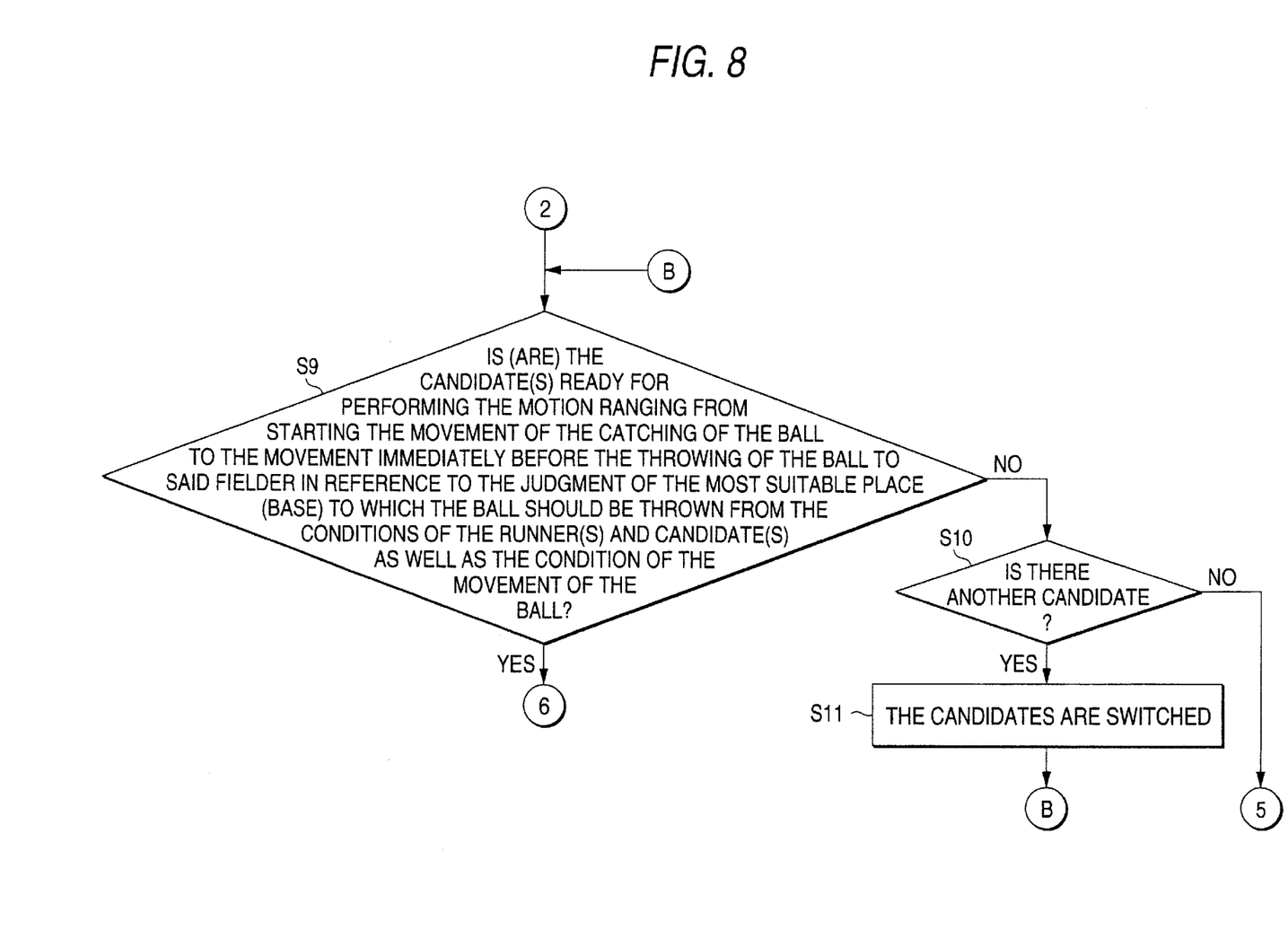
FIG. 8 is a flowchart for explaining an example of the movement according to one mode of the present invention.
Figure 9:
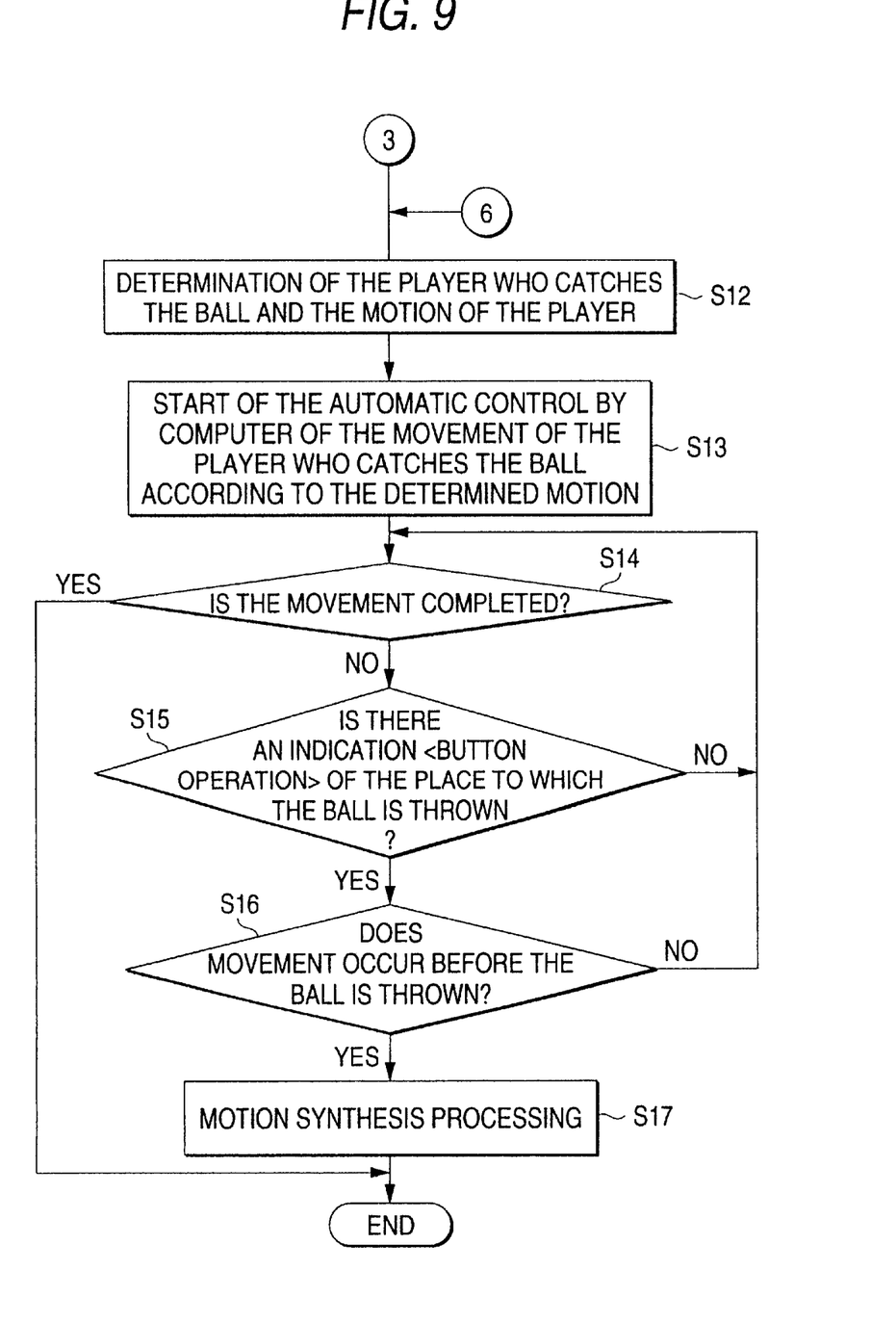
FIG. 9 is a flowchart for explaining an example of the movement according to one mode of the present invention.

Next, the movement according to the present mode is described. FIGS. 7, 8 and 9 show a flow chart for describing the movement according to one mode of the present invention. This flow chart describes the movement example of a player (the fielder) who catches the ball when the batter hits the ball thrown by the pitcher or a fielder holding the ball is going to throw the ball to a base.

In the following an example is cited to describe the movement since the point in time when the batter made a hit, in order to make the flow of the explanation easier to understand. First, it is judged which fielder is able to catch the ball in accordance with the direction of the ball hit by the batter (Step S1). One, or multiple fielders, who are located within a range of, for example, 20 degrees to 30 degrees to either side of the line made by the hit ball, become candidates for the catching of the ball. Here, in the case of a bunt, the selection of the candidate does not rely on the angle of the hit ball but, rather, the catcher, the pitcher, or the like, become the candidates for the catching of the ball. And in the case of an outfield fly the selection of the candidates automatically excludes infielders. In addition, in the case of a line drive to the left, the left fielder becomes the only candidate for the catching of the ball.

Next, the process for making the fielders cover each base is started (Step S2) and the operation of the joystick 50e provided on the keypad 50 (or keys indicating the direction provided on the keypad 50) is confirmed (Step S3). In the case that the operation of the joystick 50e is confirmed (Step S3: YES route), processing is carried out to move the fielder who was selected as the operational object according to the operation on the field (Step 4).

In the case of joystick 50e, the direction or the amount of movement of the fielder are determined according to the tilted condition of the joystick 50e. And, in the case that the keys indicating the direction are used, keys are, respectively, made to correspond to the directions of up and down and left and right so that the fielder is moved according to the amount of the pressing of the key in the direction corresponding to the key which is operated.

In the case that the operation of the joystick 50e is not confirmed (Step S3: NO route), or after the processing of Step 4 is carried out, a prior input for throwing the ball is confirmed (Step S5). This prior input means a button operation for indicating the throwing of the ball to the base designated by the user before the fielder catches the ball after the batter hits the ball. This button operation makes it possible to throw the ball to any one of first base, second base, third base or home plate.

In the present mode, buttons are made to correspond to first base, second base, third base or home plate, respectively, and, therefore, when the button 50a, which corresponds to first base is operated, the indication of the throwing of the ball to first base is done by prior input. When the button 50c, corresponding to third base, is operated the indication of the throwing of the ball to third base is done by prior input. Then when the button 50d corresponding to home plate is operated, the indication of the throwing of the ball to third base is done by prior input.

Here, though in the present mode the relationships between the buttons and the places to which the ball is thrown have a one to one correspondence, the present invention is not limited to this and a combination of two or more buttons or the combination of one or more buttons and a joystick may indicate the place to which the ball is thrown.

In the case that there is a prior input of the throwing of the ball (Step S5: Yes route), for example, first the condition of the first candidate (position, posture or the like), the condition of the hit ball (direction of the hit ball, power of the hit ball, or the like) are recognized. In light of this recognition result, whether the candidate is able to catch the ball or not is judged. Here, even in the case that the path of the ball being thrown is realistically expressed, the above described recognition is carried out by adding the condition of the fielder who covers the base, indicated by the prior input.

Multiple types of motion sequences, for the player to move in sequence from a set position in preparation for the catching of the ball to a position immediately before the throwing of the ball, are allocated, in advance, to the candidates. There it is judged whether a sequence of motions exists to start the catching of the ball in light of the above described recognition result (Step S6) among the types of motion sequences (see FIG. 5). In the judgment of whether the catching of the ball is possible or not, as shown in FIG. 5, it is judged according to whether or not a fielder can be expected to be in a posture of the catching of the ball on the path of the hit ball in the case that each fielder moves according to the number of frames allocated for the fielder. Here, in reference to FIG. 5, it can be judged how many frames there are before the catching of the ball since the number of frames is allocated for the motion from the catching of the ball to the throwing of the ball.

In the case that, from a sequence of motions performed by the candidate, it is judged that he is able to reach the position of the catching of the ball the candidate is judged to perform a sequence of motions in preparation for the catching of the ball (Step S6: YES route) and, therefore, that sequence of motions is confirmed and the candidate is determined as the player who catches the ball (Step S12).

The movement of the player who catches the ball is automatically controlled by computer in accordance with a sequence of motions determined in Step S12 (Step S13). When from the sequence of motions performed by the candidate it is judged that he is not able to reach the position of the catching of the ball in Step S6 (Step S6: NO route), the process is shifted to Step S7.

In this case, it is confirmed whether or not another candidate (next candidate) exists (Step S7). In the case that the next candidate exists (Step S7: YES route), a switch to the next candidate is carried out (Step S8) and the process is returned to Step S6. In Step S6, the same processing as described above is carried out for the candidate switched to in Step S8.

In the case that the sequence of processings of the above Step S6, Step S7 and Step S8 are carried out for all the candidates to confirm that none of them performs a sequence of motions (Step S7: NO route), the process returns to Step S3. The same processing as described above is carried out from Step S3.

And, in the case that no prior input for the throwing of the ball is confirmed in Step S5 (Step S5: NO route), it can be judged to which base the ball should be thrown from relevant factors such as the condition of the first candidate (position, posture, or the like), the condition of the hit ball (direction of the hit ball, power of the hit ball, or the like), the condition of the fielder who is covering a base, the condition of runners and the like. Here, this processing is one example of the case where the computer determines the most suitable place to which the ball is thrown.

For example, in the case that the ball is hit toward the short stop under the condition where there is a runner on first base, it would be the best judgment that the shortstop throw the ball to second base after catching the ball. And in the case that the hit ball is a grounder to first base, since the first baseman goes forward to move so as to catch the ball, it would be the best judgment that the pitcher cover first base so that the ball can be thrown to first base.

In light of the above judgment results, the judgment is made whether or not a candidate is able to catch the ball. As shown in FIG. 5, multiple types of motion sequences for moving in sequence from a position in preparation for the movement of the catching of the ball to a position of the throwing of the ball are allocated to a candidate, that is to say a fielder, in advance. In the case that the motion before the catching of the ball is adopted, a sequence of motions from a position in preparation for the movement of the catching of the ball to a position immediately before the throwing of the ball may, of course, be applied. Therefore, it is judged whether a sequence of motions which makes the catching of the ball possible, in light of the above described judgment result, exists among the types of motion sequences performed by the candidates (Step S9).

As for the expectation calculation for each sequence of motions of each candidate, the same description with respect to Step S6 is applied and a repetition of the description is omitted. In the case that a candidate is judged to perform a sequence of motions for a position in preparation of the catching of the ball (Step S9: YES route) the motion is confirmed and the candidate is determined as the player who catches the ball (Step S12). The movement of the player who catches the ball is automatically controlled by computer according to a sequence of motions determined in Step S12 (Step S13).

And, in the case that a candidate is judged not to perform a sequence of motions in preparation for the catching of the ball in Step S9 (Step S9: NO route), it is confirmed whether another candidate (next candidate) exists or not (Step S10). In the case that the next candidate exists (Step S10: YES route), the candidate is switched to (Step S11), and the process returns the Step S9. In Step S9 the same processing as described above is carried out for the candidate switched to in Step S11.

In the case that the sequence of processing in the above Step S9, Step S10 and Step S11 is carried out for all of the candidates to confirm that the motion is not performed (Step S10: NO route), the process returns to Step S3. The same processing described above is carried out from Step S3.

When the movement of the player who catches the ball starts in Step S13, the completion of the movement is judged in Step S14 (Step S14). When the completion of the movement is confirmed in this Step S14 (Step S14: YES route), the processing is completed. On the other hand, in the case that the movement is not completed (Step S14: NO route), the process is shifted to Step S15. According to the judgment in Step S14, in the case that the process is shifted from Step S6, the motion from the catching of the ball to the throwing of the ball is processed and, therefore, the completion of the throwing of the ball becomes the end of the movement (FIGS. 3 and 4 as an example). On the other hand, in the case that the process is shifted from Step S9, the motion before catching the ball is processed and, therefore, the completion of the catching of the ball becomes the end of the movement (FIG. 2 as an example).

In Step S15, an indication of the throwing of the ball is confirmed by a button operation during the motion immediately before the throwing of the ball is carried out. In the case that the operation of the button is not confirmed (Step S15: NO route), the processing returns to Step S15 to confirm the completion of the movement again (Step S14). On the other hand, in the case that the operation of the button is confirmed (Step S15: YES route), it is judged that the indication of the movement before the throwing of the ball is entered and it is judged whether or not the motion which is processed at the present point in time is before the throwing of the ball (Step S16). This judgment is made based on how the motion in sequence progresses.

For example, in the case that the result of the judgment of "after the throwing of the ball" is gained (Step S16: NO route), the process returns to Step S14. In the case that the motion being processed at the present point is already a part of the movement after the throwing of the ball, the motion is continued, at once, immediately before the throwing of the ball and the processing is carried out which makes the movement of the player who catches the ball be in the neutral condition. Here, the neutral condition indicates the condition where the stance is shifted so that the ball is set at the chest level in preparation for the throwing of the ball at any time instead of the condition where the motion of the player who catches the ball is shifted to the movement of the throwing of the ball. Thereby, the completion of the movement is confirmed in Step S14 (YES route), and the processing in completed. Here, in this case, the motion, at the place to which the ball is thrown, which is indicated by a later button operation is to be processed after becoming the neutral condition.

In the case that there is an indication of the movement involving the throwing of the ball in Step S15 (Step S15: YES route) and in addition, the result of the judgment is gained such that the movement is before the throwing of the ball in Step S16 (Step S16: YES route), the motion until the throwing of the ball is processed (Step S17) by synthesizing the present motion in accordance with the place to which the ball is thrown and the motion in accordance with the place to which the ball is thrown as has been indicated to throw the ball in Step S15 (determined by the button).

In Step S17, which button is operated is judged from the button operation confirmed in Step S15 and, in addition, it is judged to which base the ball has been indicated to be thrown from the judged button. This judgment determines the final place to which the ball is thrown.

In the case that it is judged that the present place to which the ball is thrown and the place to which the ball has been indicated to be thrown in Step S15 (the button determines) agree with each other in Step S17, the place to which the ball is thrown is not switched to and the processing is carried out as an indication of the same place to which the ball is thrown. On the other hand, in the case that the judgment of no agreement is made, the place to which the ball is thrown is switched to and the motion for throwing the ball to the place confirmed in Step S15 is formed.

When the motion to be synthesized in this way is determined, the movement of the fielder (the player who catches the ball) is automatically controlled by the computer until the throwing of the ball is completed while synthesizing the determined motion in sequence with the present motion.

As described above, according to the present mode, since an indication of the base to which the ball is moved can be input through the operation according to the most suitable timing in a baseball game, the balance between the movement of the displayed fielder and the ease of the operation by the user improves. As a result, it becomes possible to implement a smooth development of the game.

Though the ball is thrown to a desired base by button operation in the above described mode, the present invention is not limited to this and, rather, may implement the movement of the ball to a desired base through the operation combining a joystick and buttons, in the case that a joystick is provided on the keypad. It is not, of course, limited to the usage of the joystick but may be a combination between the direction keys (also called the keys arranged in a cross) and buttons provided on the keypad of the game machine.

Though a baseball game is cited as an example of ball games in the above described mode, the present invention is not limited to this, rather, it is possible to be applied to a sport wherein a player catches a ball and the ball is sent out in an arbitrary direction in accordance with the operation by the user, such as soccer, basketball, American football, tennis and ice hockey.

It is possible for the present invention to be applied to any of: a game machine, an arcade machine, a personal computer, a portable information terminal, a cellular phone or the like.

Though the program for implementing one mode of the present invention is recorded on a CD-ROM or a hard disk in the above described mode, the present invention is not limited to this, rather the program may be recorded in a computer readable recording medium such as an MO (magneto-optical disk) and a DVD. And in the case that the above described program is downloaded onto a hard disk, a commercial network, the Internet, an intranet, an extranet or the like may be utilized as the network 111.

As described above, according to the present invention, since an indication of the place to which the ball is moved can be input through the operation according to the most suitable timing in a ball game, the balance between the movement of a displayed player and the ease of the operation by the user improves and, thereby, the effects are achieved that a computer readable recording medium where a program of a ball game, which makes it possible to implement the smooth development of the game, is recorded and the program, as well as a ball game processing device and method, are gained.

What is claimed is:

1. A computer readable recording medium where a program of a ball game, that implements a ball game in which the movement of players and a ball are controlled on a display using a plurality of buttons, is recorded, said recording medium where the program is recorded for making said computer:

accepting a button operation by a user before a player receives the ball;

making each of said buttons, respectively, correspond to a different predetermined place to which the ball is moved in accordance with the game in progress and judging said predetermined place to which the ball is moved, to which the operated button is made to correspond, in response to said button operation by the user; and displaying the motion wherein said ball is moved to said predetermined place which has been judged with respect to said player.

2. A computer readable recording medium where a program of a ball game, that implements a ball game in which the movement of players and a ball are controlled on a display using a plurality of buttons, is recorded, said recording medium where the program is recorded for making said computer:

accepting a button operation by a user before a player receives the ball;

making each of said buttons, respectively, correspond to a different predetermined place to which the ball is moved in accordance with the game in progress and judging said predetermined place to which the ball is moved, to which the operated button is made to correspond, in response to said button operation by the user in the case that said button operation by the user is accepted before said player receives said ball; and displaying the motion wherein said ball is moved to said predetermined place, which has been judged with respect to said player, including the condition before said ball is received by said player.

3. The recording medium according to claim 1, wherein the recorded program further makes said computer display the motion wherein said ball is moved to said predetermined place which is so judged with respect to said player, and display the movement of said ball to said predetermined place as being so judged following the display of said motion.

4. A program of a ball game, that implements a ball game in which the movement of players and a ball are controlled on a display using a plurality of buttons, said program for making a computer:

accepting a button operation by a user before a player receives the ball;

making each of said buttons, respectively, correspond to a different predetermined place to which the ball is moved in accordance with the game in progress and judging said predetermined place to which the ball is moved, to which the operated button is made to correspond, in response to said button operation by the user; and displaying the motion wherein said ball is moved to said predetermined place which has been judged with respect to said player.

5. A program of a ball game, that implements a ball game in which the movement of players and a ball are controlled on a display using a plurality of buttons, said program for making a computer:

accepting a button operation by a user before a player receives the ball;

making each of said buttons, respectively, correspond to a different predetermined place to which the ball is moved in accordance with the game in progress and judging said predetermined place to which the ball is moved, to which the operated button is made to correspond, in response to said button operation by the user in the case that said button operation by the user is accepted before said player receives said ball; and displaying the motion wherein said ball is moved to said predetermined place, which has been judged with respect to said player, including the condition before said ball is received by said player.

6. The program according to claim 4, further comprising making said computer display the motion wherein said ball is moved to said predetermined place which is so judged with respect to said player, and display the movement of said ball to said predetermined place as being so judged following the display of said motion.

7. A ball game processing device comprising:
   a computer readable recording medium where a program, that implements a ball game in which the movement of players and a ball are controlled on a display using a plurality of buttons, is recorded;
   a computer which reads out at least part of the program from said recording medium so as to be implemented; and
   a display for displaying the ball game implemented by said computer,
      wherein said computer reads out at least part of the program from said recording medium and executes:
         accepting a button operation by a user before a player receives the ball;
         making each of said buttons, respectively, correspond to a different predetermined place to which the ball is moved in accordance with the game in progress and judging said predetermined place to which the ball is moved, to which the operated button is made to correspond, in response to said button operation by the user; and
         displaying, on said display, the motion wherein said ball is moved to said predetermined place which has been judged with respect to said player.

8. A ball game processing device comprising:
   a computer readable recording medium where a program, that implements a ball game in which the movement of players and a ball are controlled on a display using a plurality of buttons, is recorded;
   a computer which reads out at least part of the program from said recording medium so as to be implemented; and
   a display for displaying the ball game implemented by said computer,
      wherein said computer reads out at least part of the program from said recording medium and executes:
         accepting a button operation by a user before a player receives the ball;
         making each of said buttons, respectively, correspond to a different predetermined place to which the ball is moved in accordance with the game in progress and judging said predetermined place to which the ball is moved, to which the operated button is made to correspond, in response to said button operation by the user in the case that said button operation by the user is accepted before said player receives said ball; and
         displaying, on said display, the motion wherein said ball is moved to said predetermined place, which has been judged with respect to said player, including the condition before said ball is received by said player.

9. The ball game processing device according to claim 7, further comprising making said computer display the motion wherein said ball is moved to said predetermined place which is so judged with respect to said player, and display the movement of said ball to said predetermined place as being so judged following the display of said motion.

10. A method for processing a ball game, that implements a ball game in which the movement of players and a ball are controlled on a display using a plurality of buttons, said method for processing a ball game comprising:
   accepting a button operation by a user before a player receives the ball;
   making each of said buttons, respectively, correspond to a different predetermined place to which the ball is moved in accordance with the game in progress and judging said predetermined place to which the ball is moved, to which the operated button is made to correspond, in response to said button operation by the user; and
   displaying the motion wherein said ball is moved to said predetermined place which has been judged with respect to said player.

11. A method for processing a ball game, that implements a ball game in which the movement of players and a ball are controlled on a display using a plurality of buttons, said method for processing a ball game comprising:
   accepting a button operation by a user before a player receives the ball;
   making each of said buttons, respectively, correspond to a different predetermined place to which the ball is moved in accordance with the game in progress and judging said predetermined place to which the ball is moved, to which the operated button is made to correspond, in response to said button operation by the user in the case that said button operation by the user is accepted before said player receives said ball; and
   displaying the motion wherein said ball is moved to said predetermined place, which has been judged with respect to said player, including the condition before said ball is received by said player.

12. The method for processing a ball game according to claim 10, wherein the recorded program further makes said computer display the motion wherein said ball is moved to said predetermined place which is so judged with respect to said player, and display movement of said ball to said predetermined place as being so judged following the display of said motion.

* * * * *

UNITED STATES PATENT AND TRADEMARK OFFICE
CERTIFICATE OF CORRECTION

PATENT NO.    : 6,334,813 B1
DATED         : January 1, 2002
INVENTOR(S)   : S. Rimoto et al.

It is certified that error appears in the above-identified patent and that said Letters Patent is hereby corrected as shown below:

<u>Title page,</u>
Item [30], Foreign Application Priority Data, "12-141275" should be
-- 2000-141275 --.

Signed and Sealed this

Twenty-eighth Day of January, 2003

JAMES E. ROGAN
*Director of the United States Patent and Trademark Office*